US012769682B2

(12) United States Patent
Downing et al.

(10) Patent No.: US 12,769,682 B2
(45) Date of Patent: Oct. 20, 2026

(54) INTELLIGENT INTER-PROCESSOR INTERRUPT MANAGEMENT FOR STORAGE ARRAY MULTIPROCESSOR SYSTEMS

(71) Applicant: Dell Products L.P., Round Rock, TX (US)

(72) Inventors: Troy Downing, Hopkinton, MA (US); Jonathan Krasner, Coventry, RI (US); Julie Zhivich, Westborough, MA (US)

(73) Assignee: Dell Products L.P., Round Rock, TX (US)

(*) Notice: Subject to any disclaimer, the term of this patent is extended or adjusted under 35 U.S.C. 154(b) by 658 days.

(21) Appl. No.: 17/974,953

(22) Filed: Oct. 27, 2022

(65) Prior Publication Data

US 2024/0143523 A1 May 2, 2024

(51) Int. Cl.
*G06F 13/26* (2006.01)
*G06F 1/3228* (2019.01)

(52) U.S. Cl.
CPC ............ *G06F 13/26* (2013.01); *G06F 1/3228* (2013.01)

(58) Field of Classification Search
CPC ............................... G06F 13/26; G06F 1/3228
See application file for complete search history.

(56) References Cited

U.S. PATENT DOCUMENTS

| | | | | |
|---|---|---|---|---|
| 4,858,108 | A * | 8/1989 | Ogawa | G06F 13/26 710/6 |
| 9,258,242 | B1 * | 2/2016 | Mallick | H04L 47/2425 |
| 2007/0180310 | A1 * | 8/2007 | Johnson | G06F 15/16 714/12 |
| 2010/0161853 | A1 * | 6/2010 | Curran | G06F 13/385 710/39 |
| 2011/0047310 | A1 * | 2/2011 | Bonola | G06F 13/24 710/268 |
| 2011/0179416 | A1 * | 7/2011 | Patale | G06F 9/5033 712/E9.034 |
| 2020/0004587 | A1 * | 1/2020 | Griffin | G06F 9/4856 |
| 2022/0012060 | A1 * | 1/2022 | Fok | G06N 3/048 |
| 2022/0094613 | A1 * | 3/2022 | Wang | H04L 43/10 |
| 2023/0056500 | A1 * | 2/2023 | Estep | G06F 9/526 |
| 2023/0136918 | A1 * | 5/2023 | Chandrashekhara | G06F 3/065 711/154 |

* cited by examiner

*Primary Examiner* — Aimee Li
*Assistant Examiner* — An-An Ngoc Nguyen
(74) *Attorney, Agent, or Firm* — Krishnendu Gupta; Nikhil Patel

(57) ABSTRACT

One or more aspects of the present disclosure relate to controlling threads across several processors. For example, at least one input/output (IO) workflow message can be stored in a storage array's hardware queue. Additionally, an IO workflow message can be read from the hardware queue. Further, a local thread wake-up or an interrupt-wakeup operation can be performed based on a target of the IO workflow message.

20 Claims, 4 Drawing Sheets

INTELLIGENT INTER-PROCESSOR INTERRUPT MANAGEMENT FOR STORAGE ARRAY MULTIPROCESSOR SYSTEMS

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services. Further, the CMS can establish threads based on each processor's core count to perform one or more storage service-related tasks.

SUMMARY

In aspects, a method includes storing at least one input/output (IO) workflow message in a storage array's hardware queue, reading the at least one IO workflow message from the hardware queue, and performing a local thread wake-up or an interrupt-wakeup operation based on a target of the at least one IO workflow message.

In embodiments, the at least one IO message can correspond to at least one IO workflow, and the at least one IO workflow can include one or more operations for processing an IO request type.

In embodiments, the method can further include receiving an IO workload including one or more IO requests by the storage array, establishing at least one IO workflow for processing each IO request based on corresponding IO request types, and generating the at least one IO workflow message for each IO workflow.

In embodiments, the method can further include storing a pointer to the at least one IO workflow message in a shared memory queue.

In embodiments, the method can further include load-balancing reads of the at least one IO message from the hardware queue among each storage array component instance or emulation. Other technical features may be readily apparent to one skilled in the art from the following figures, descriptions, and claims.

In embodiments, the method can further include identifying an IO message target by parsing metadata from the at least one IO message and identifying a shared memory queue corresponding to the at least one IO message based on the IO message target.

In embodiments, the method can further include enabling each component instance or emulation to define corresponding shared memory queues and enabling each component instance or emulation to define corresponding instance threads for processing a subject IO workflow message.

In embodiments, the method can further include establishing at least one shared message queue based on each distinct type of IO workflow.

In embodiments, the method can further include registering each thread of each storage array component instance or emulation with a related shared memory queue, monitoring the activity of each shared memory queue, and for each shared memory queue, issuing activity update signals to corresponding registered threads.

In embodiments, the method can further include performing a local thread wake-up or an interrupt-wakeup operation based on the activity update signal. Other technical features may be readily apparent to one skilled in the art from the following figures, descriptions, and claims.

In other aspects, a system, with a processor and memory, is configured to store at least one input/output (IO) workflow message in a storage array's hardware queue, read the at least one IO workflow message from the hardware queue, and perform a local thread wake-up or an interrupt-wakeup operation based on a target of the at least one IO workflow message.

In embodiments, the at least one IO message can correspond to at least one IO workflow, and the at least one IO workflow can include one or more operations for processing an IO request type.

In embodiments, the system can be further configured to receive an IO workload including one or more IO requests by the storage array, establish at least one IO workflow for processing each IO request based on corresponding IO request types, and generate the at least one IO workflow message for each IO workflow.

In embodiments, the system can be further configured to store a pointer to the at least one IO workflow message in a shared memory queue.

In embodiments, the system can be further configured to load balance reads of the at least one IO message from the hardware queue among each storage array component instance or emulation. Other technical features may be readily apparent to one skilled in the art from the following figures, descriptions, and claims.

In embodiments, the system can be further configured to identify an IO message target by parsing metadata from the at least one IO message and identify a shared memory queue corresponding to the at least one IO message based on the IO message target.

In embodiments, the system can be further configured to enable each component instance or emulation to define corresponding shared memory queues and enable each component instance or emulation to define corresponding instance threads for processing a subject IO workflow message.

In embodiments, the system can be further configured to establish at least one shared message queue based on each distinct type of IO workflow.

In embodiments, the system can be further configured to register each thread of each storage array component instance or emulation with a related shared memory queue, monitor the activity of each shared memory queue, and for each shared memory queue, issue activity update signals to corresponding registered threads.

In embodiments, the system can be further configured to perform a local thread wake-up or an interrupt-wakeup operation based on the activity update signal. Other technical features may be readily apparent to one skilled in the art from the following figures, descriptions, and claims.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. These companies often use storage arrays to store and manage the data. Because a business can configure a storage array with multiple storage devices (e.g., hard-disk drives (HDDs) or solid-state drives (SSDs)), a company can scale (e.g., increase or decrease) and manage an array's storage capacity more efficiently compared to a server. In addition, a company can use a storage array to read/write data required by one or more business applications.

A storage array can have a multiprocessor architecture allowing it to perform several tasks in parallel. Specifically, a multiprocessor storage array includes multiple interconnected CPUs (central processing units), allowing a single task or several tasks to be divided amongst them for fast execution. Further, each CPU can include one or more cores, each of which can perform a task in parallel. For each CPU's core, the storage array can establish at most two threads (e.g., virtual cores) that enable the CPU to perform additional tasks in parallel. In addition, a process can create a thread. For example, a process is an executing program that creates a thread when it starts. Accordingly, the process's thread handles all the process's corresponding tasks. Further, processes can be divided among two or more threads corresponding to different CPU cores. Thus, the threads can use IPC (inter-process communication) techniques to exchange data and synchronize their respective execution of related tasks.

Further, a storage array can include several hardware components shared amongst two or more processes that deliver storage services. Accordingly, processes can be required to alert CPU threads of hardware activity. Current naïve approaches use an IPI (inter-processor interrupt) technique that requires the process's CPU to establish a new thread to interrupt a thread on another CPU or core when the process requires action by the thread on the other CPU or core. However, IPIs are limited in number, and unique IPIs are not always available. For example, current naïve techniques require a CPU to use external interrupts to deliver an IPI to another CPU or CPU group.

Embodiments of the present disclosure relate to intelligent IPI generation and delivery techniques that reduce the number of interrupts each CPU experiences. Further, the embodiments advantageously reduce the total number of IPIs required by a multiprocessor system.

Figure 1:
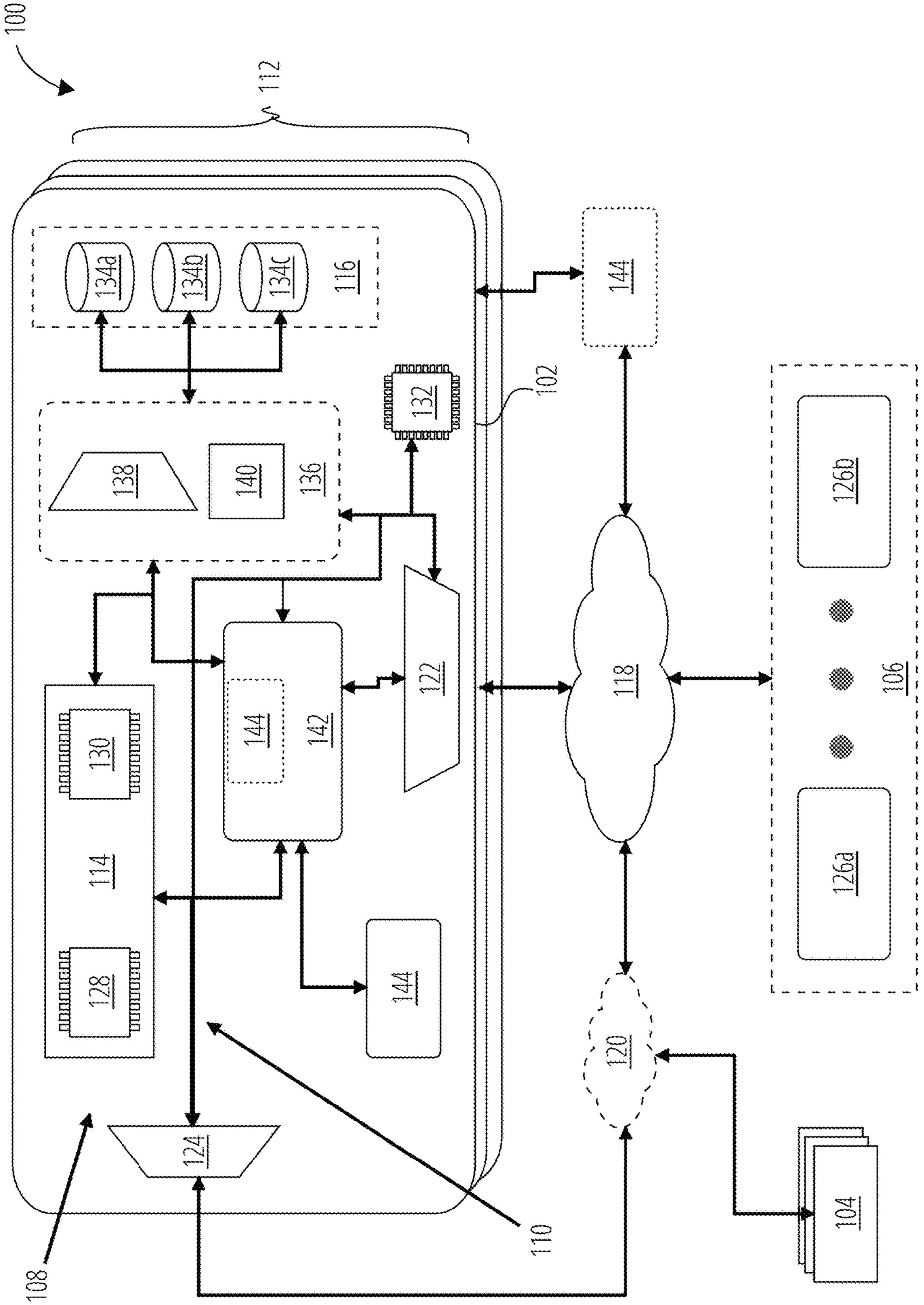
FIG. 1 shows a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112 that includes two or more storage arrays, including the storage array 102.

In embodiments, the storage array 102, components 108, and remote system 104 can include a variety of proprietary or commercially available single or multiprocessor systems (e.g., parallel processor systems). Single or multiprocessor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), and Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-b*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processor 132 can execute to perform one or more storage-related services. For example, the storage array 102 can have a multiprocessor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 134*a-c*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 136) that manages access to the array's persistent storage 116. For example, the DI 136 can include a device adapter (DA 138) (e.g., storage device controller), flash drive interface 140, and the like that controls access to the array's persistent storage 116 (e.g., storage devices 128*a-c*).

Likewise, the storage array 102 can include an Enginuity Data Services processor (EDS 142) that can manage access to the array's memory 114. Further, the EDS 142 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 142 can deliver hosts 106 (e.g., client machines 126*a-b*) remote/distributed storage services by virtualizing the storage array's memory/storage resources (memory 114 and persistent storage 116, respectively).

In embodiments, the storage array 102 can also include a controller 144 (e.g., management system controller) that can reside externally from or within the storage array 102 and one or more of its components 108. When external from the storage array 102, the controller 144 can communicate with the storage array 102 using any known communication connections. The communications connections can include a serial port, parallel port, network interface card (e.g., Ethernet), etc. Further, the controller 144 can include logic/circuitry that performs one or more storage-related services. For example, the controller 144 can have an architecture designed to manage the storage array's computing, processing, storage, and memory resources as described in greater detail herein.

Figure 2:
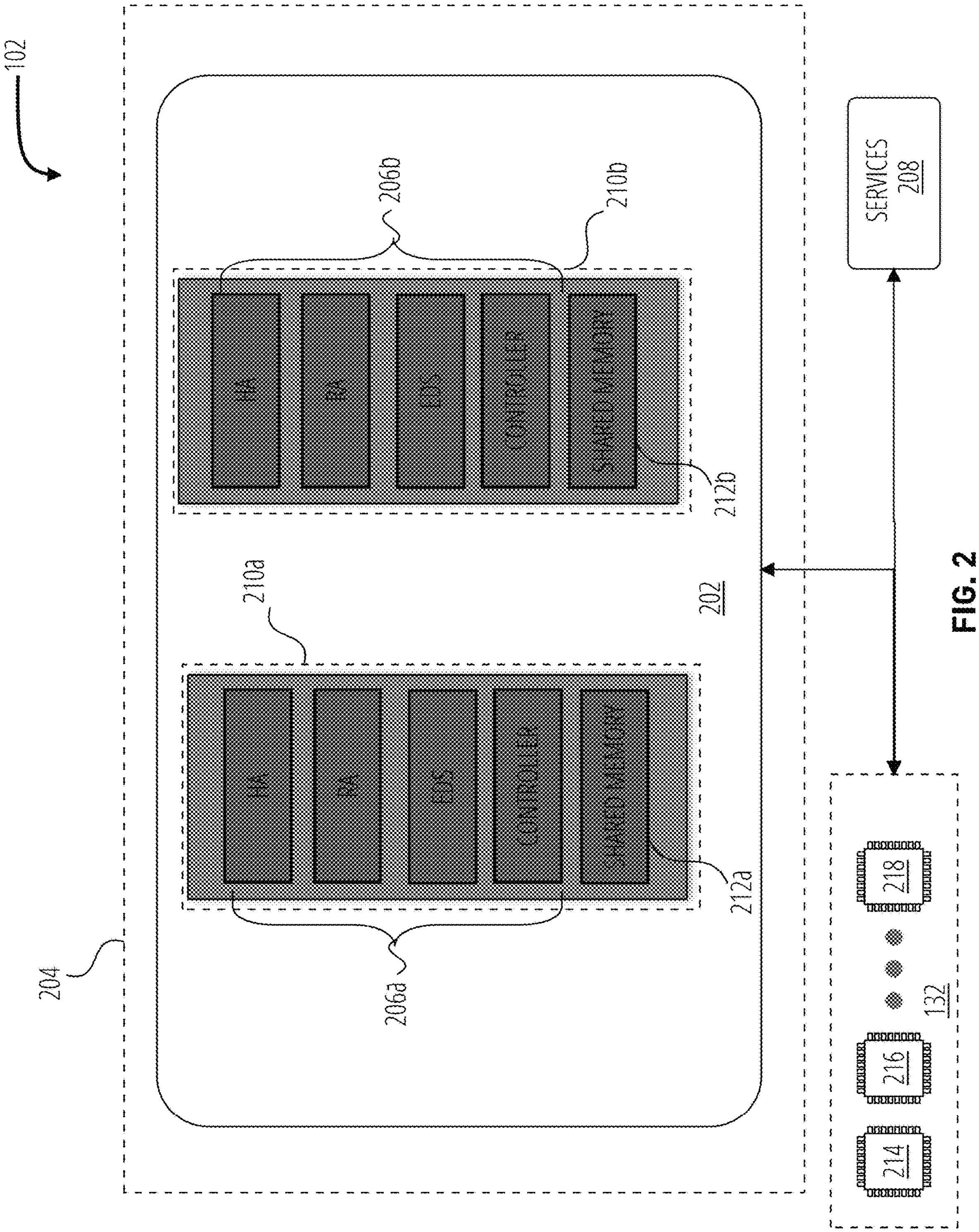
FIG. 2 is a block diagram of a storage array engine in accordance with embodiments of the present disclosure.

Regarding FIG. 2, a storage array 102 of FIG. 1 can include at least one engine 202 housed in shelf 204 (e.g., housing) that interfaces with the storage array's cabinet or rack (not shown). The engine 202 includes hardware, circuitry, and logical elements that perform one or more storage array services. For example, the engine 202 can include a pair of boards 204*a*-204*b*, including hardware instances 206*a* and hardware instances 206*b*, respectively, of storage array components (e.g., components 108 of FIG. 1). In the non-limiting example shown by FIG. 2, the boards 204*a*-204*b* include respective hardware instances 206*a*, 206*b* (e.g., emulations) of an HA, RA, EDS, and controller (e.g., HA 122, RA 124, EDS 142, and controller 144 of FIG. 1).

In embodiments, the boards 204*a*-204*b* can include respective shared memory (e.g., shared memory 208*a*, 208*b*). The shared memory 208*a*, 208*b* can include RAM, DRAM, SRAM, and the like. Additionally, each board's controller can allocate a portion of the storage array's GM (e.g., the GM 130 of FIG. 1) as local memory (LM) for each board's corresponding hardware instances 206*a*, 206*b*. Further, the hardware instances 206*a*, 206*b* can store respective hardware threads in their LMs or respective shared memory 208*a*, 208*b*. For example, an HA instance can store a HA thread, including one or more instructions defining a host adapter activity or service. For example, the hardware instances 206*a*, 206*b* can establish their respective hardware threads using one of the CPUs 214, 216, 218, or their respective cores (not shown). Accordingly, each board's shared memory 208*a*, 208*b* can store a searchable data structure that maps the hardware threads to their respective CPUs or cores.

In addition, the storage array 102 can provide storage services 208 (e.g., processes) corresponding to one or more of the hardware instances 206*a*, 206*b*, and their respective hardware threads. Accordingly, the services 208 can establish respective process threads corresponding to respective hardware instances 206*a*, 206*b*, and corresponding hardware threads.

Further, each board's shared memory 208*a*, 208*b* can store an event registry (e.g., event registry 302 of FIG. 3) defining one or more activities or events (e.g., event records 304 of FIG. 3) corresponding to one or more of each board's hardware instances 206*a*, 206*b*. In addition, each hardware thread or process thread can subscribe to receive alerts for one or more of the event registry's defined events.

Figure 3:
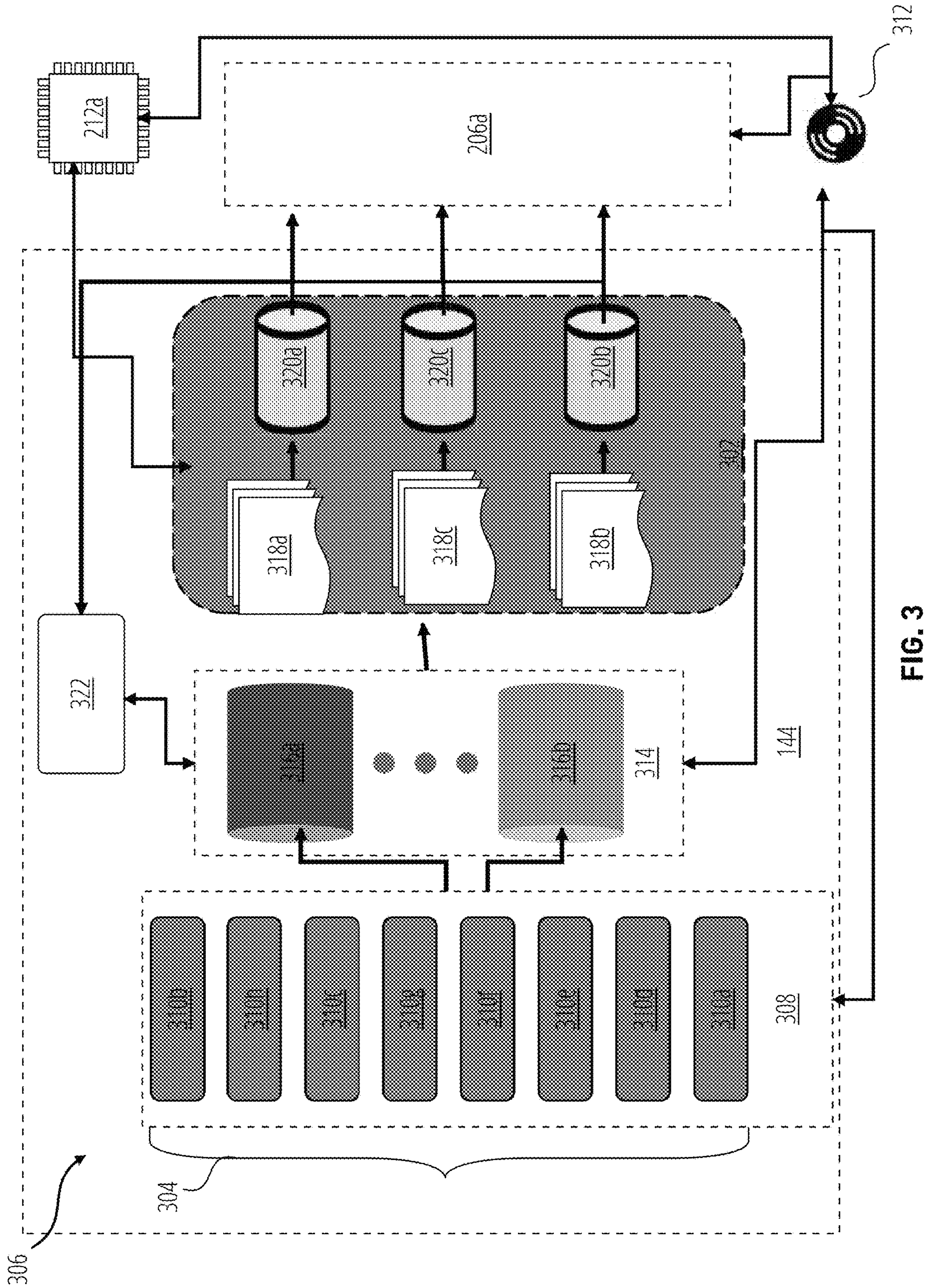
FIG. 3 is a block diagram of a controller in accordance with embodiments of the present disclosure.

Regarding FIG. 3, the storage array 102 includes a controller 144 including hardware, circuitry, and logical elements 306 that manage communications between threads across the storage arrays processors (e.g., processors 132 of FIG. 1 and CPUs 214, 216, 218 of FIG. 2). For example, the controller 144 can correspond to the controller instance of the board 210*a* hardware instances 206*a*.

In embodiments, the controller 144 can include a hardware queue 308 that buffers event records 304. For example, the event records 304 can correspond to events 310*a*-310*b* of one or more of the hardware instances 206*a*. Further, the event records 304 can include information identifying the hardware instance, hardware thread, and process thread, e.g., using respective unique identifiers (IDs).

In embodiments, the controller 144 can establish a daemon 312 that communicatively couples to the hardware instances 206*a*. The daemon 312 can monitor the hardware instances 206*a* for events. In response to detecting an event (e.g., event 310*a*), the daemon 312 can add the event to the event records 304 buffered by the hardware queue 308.

In embodiments, the controller 144 can include an instance manager 314 that distributes the reading and processing of each event 306*a*-306*h* from the hardware queue 308 across the hardware instances 206*a*. For example, the instance manager 314 can establish a round-robin schedule where the hardware instances 310*a*-310*b* (e.g., the next two instances of the hardware instances 206*a*, 206*b* in the round-robin schedule) read and process the event records 304 in a circular order. In other examples, the instance manager 314 can dynamically select one of the hardware instances 310*a*-310*b* based on their respective CPU utilization levels. Further, the instance manager 314 can establish a first-in-first-out (FIFO) rule for reading and parsing the event records 304 from the hardware queue 308.

In embodiments, a hardware thread (e.g., the hardware instance 316*a*) reads and processes event 310*a* from the hardware queue. For example, the hardware instance 316*a* parses metadata from the event 310*a* to identify its corresponding hardware instance, hardware thread, and process thread. Based on the identified process thread, the hardware instance 316*a* searches the event registry 302 stored in shared memory 212*a* for a process queues 318*a*-318*b* corresponding to the identified process thread. Upon finding the corresponding process queue, the hardware instance 316*a* identifies the registered threads 320*a*-320*b* subscribed to receive an alert corresponding to the event 310*a*.

In embodiments, suppose the event 310*a* targets process queue 318*a* with a registered thread 320*a* corresponding to hardware instance 316*a* that reads event 310*a* from the hardware queue 308. In such circumstances, the hardware instance 316*a* can directly issue a wake-up signal to its registered thread 320*a*.

In embodiments, suppose the hardware instance 316*b* reads event 310*c* that targets process queue 318*b* having a registered thread 320*b* corresponding to another one of the hardware instances 206*a*. In such circumstances, the hardware instance 316*b* generates an IPI targeting an interrupt handler for the registered thread 320*b* of hardware instance 316*b*. For example, the hardware instance 316*b* can identify the interrupt handler corresponding to the registered by searching a lookup table of interrupt handlers stored in the shared memory 212*a*. Upon identifying the interrupt handler, the hardware instance 316*b* can send the IPI to an interrupt controller 322, which issues a wake-up signal to the registered thread 320*b*. For example, the interrupt controller 322 can be a bus that directs IPIs to their corresponding interrupt handlers across CPUs 214, 216, 218 of the processors 132.

The following text includes details of one or more methods or flow diagrams in accordance with this disclosure. For simplicity of explanation, each method is depicted and described as a sequence of operations. However, each sequence can be altered without departing from the scope of the present disclosure. Additionally, one or more of each sequence's operations can be performed in parallel, concurrently, or a different sequence. Further, not all illustrated operations are required to implement each method described by this disclosure.

Figure 4:
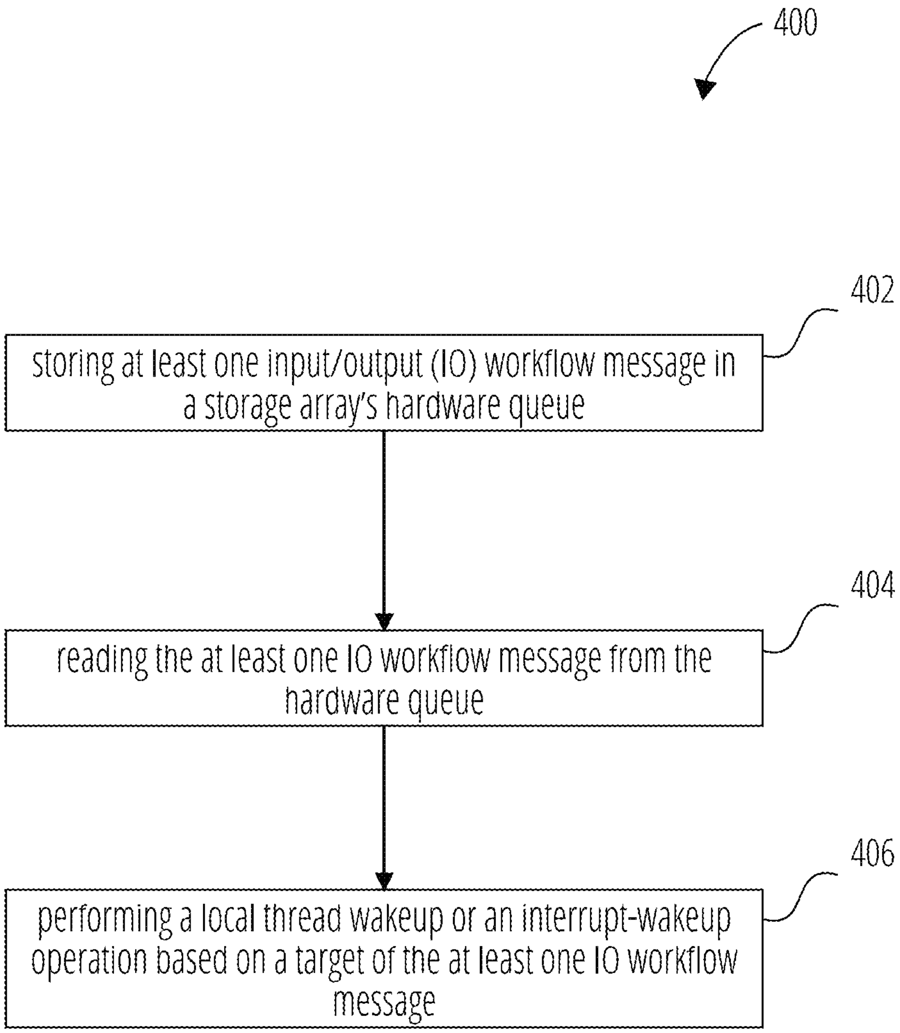
FIG. 4 is a flow diagram of a method for controlling threads across processors in accordance with embodiments of the present disclosure.

Regarding FIG. 4, an example method 400 corresponds to an alterable set of operations related to controlling threads across processors. In embodiments, the method 400, at 402, can include storing at least one input/output (IO) workflow message in a storage array's hardware queue. For example, the hardware queue 308 illustrated in FIG. 3 can store at least one input/output (IO) workflow message in a storage array's hardware queue. Additionally, at 404, the method 400 can include reading the at least one IO workflow message from the hardware queue at 404. For example, the instance manager 314 illustrated in FIG. 3 may read the at least one IO workflow message from the hardware queue.

Further, the method 400, at 406, can include performing a local thread wake-up or an interrupt-wakeup operation based on a target of the at least one IO workflow message at 406. For example, the interrupt controller 322 illustrated in FIG. 3 may perform a local thread wake-up or an interrupt-wakeup operation based on a target of the at least one IO workflow message.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

storing at least one input/output (IO) workflow message in a storage array's hardware queue implemented in dedicated hardware circuitry of a storage array controller, wherein the storage array controller manages multiprocessor thread coordination for storage array component instances operating across multiple processors in a storage array multiprocessor system;

reading the at least one IO workflow message from the hardware queue by a hardware instance manager that load-balances message processing across multiple storage array component instances using a round-robin scheduling algorithm, wherein the hardware instance manager analyzes each IO workflow message to identify a target hardware instance corresponding to a target registered thread for processing the message, wherein the target hardware instance is one of the multiple storage array component instances that is designated by metadata in the IO workflow message as responsible for handling the message; and performing a local thread wake-up or an interrupt-wakeup operation based on a target of the at least one IO workflow message, wherein the local thread wake-up directly signals the target registered thread when the target hardware instance corresponds to the hardware instance that read the message, and the interrupt-wakeup operation generates an inter-processor interrupt (IPI) targeting an interrupt handler for the target registered thread on a different hardware instance, wherein performing the wake-up operation includes parsing metadata from the IO workflow message to determine hardware instance correspondence and selectively avoiding IPI generation when the target registered thread resides on the hardware instance that performed the reading, thereby reducing total number of IPIs required in the storage array's multiprocessor system by avoiding unnecessary cross-processor interrupts through intelligent target-based wake-up decisions.

2. The method of claim 1, wherein:

the at least one IO message corresponds to at least one IO workflow, and the at least one IO workflow includes one or more operations for processing an IO request type.

3. The method of claim 1, further comprising:

receiving an IO workload including one or more IO requests by the storage array;

establishing at least one IO workflow for processing each IO request based on corresponding IO request types; and generating the at least one IO workflow message for each IO workflow.

4. The method of claim 1, further comprising:

storing a pointer to the at least one IO workflow message in a shared memory queue.

5. The method of claim 1, further comprising:

load balancing reads of the at least one IO message from the hardware queue among each storage array component instance or emulation.

6. The method of claim 5, further comprising:

identifying an IO message target by parsing metadata from the at least one IO message; and identifying a shared memory queue corresponding to the at least one IO message based on the IO message target.

7. The method of claim 6, further comprising:

enabling each component instance or emulation to define corresponding shared memory queues; and enabling each component instance or emulation to define corresponding instance threads for processing a subject IO workflow message.

8. The method of claim 2, further comprising:

establishing at least one shared message queue based on each distinct type of IO workflow.

9. The method of claim 8, further comprising:

registering each thread of each storage array component instance or emulation with a related shared memory queue;

monitoring activity of each shared memory queue; and for each shared memory queue, issuing activity update signals to corresponding registered threads.

10. The method of claim 9, further comprising:

performing a local thread wake-up or an interrupt-wakeup operation based on the activity update signal.

11. A system with a processor and memory, the system configured to:

store at least one input/output (IO) workflow message in a storage array's hardware queue implemented in dedicated hardware circuitry of a storage array controller, wherein the storage array controller manages multiprocessor thread coordination for storage array component instances operating across multiple processors in a storage array multiprocessor system;

read the at least one IO workflow message from the hardware queue by a hardware instance manager that load-balances message processing across multiple storage array component instances using a round-robin scheduling algorithm, wherein the hardware instance manager analyzes each IO workflow message to identify a target hardware instance corresponding to a target registered thread for processing the message, wherein the target hardware instance is one of the multiple storage array component instances that is designated by metadata in the IO workflow message as responsible for handling the message; and perform a local thread wake-up or an interrupt-wakeup operation based on a target of the at least one IO workflow message, wherein the local thread wake-up directly signals the target registered thread when the target hardware instance corresponds to the hardware instance that read the message, and the interrupt-wakeup operation generates an inter-processor interrupt (IPI) targeting an interrupt handler for the target registered thread on a different hardware instance, wherein performing the wake-up operation includes parsing metadata from the IO workflow message to determine hardware instance correspondence and selectively avoiding IPI generation when the target registered thread resides on the hardware instance that performed the reading, thereby reducing total number of IPIs required in the storage array's multiprocessor system by avoiding unnecessary cross-processor interrupts through intelligent target-based wake-up decisions.

12. The system of claim 11, wherein:

the at least one IO message corresponds to at least one IO workflow, and the at least one IO workflow includes one or more operations for processing an IO request type.

13. The system of claim 11, further configured to:

receive an IO workload including one or more IO requests by the storage array;

establish at least one IO workflow for processing each IO request based on corresponding IO request types; and generate the at least one IO workflow message for each IO workflow.

14. The system of claim 11, further configured to:

store a pointer to the at least one IO workflow message in a shared memory queue.

15. The system of claim 11, further configured to:

load balance reads of the at least one IO message from the hardware queue among each storage array component instance or emulation.

16. The system of claim 15, further configured to:

identify an IO message target by parsing metadata from the at least one IO message; and identify a shared memory queue corresponding to the at least one IO message based on the IO message target.

17. The system of claim 16, further configured to:

enable each component instance or emulation to define corresponding shared memory queues; and enable each component instance or emulation to define corresponding instance threads for processing a subject IO workflow message.

18. The system of claim 12, further configured to:

establish at least one shared message queue based on each distinct type of IO workflow.

19. The system of claim 18, further configured to:

register each thread of each storage array component instance or emulation with a related shared memory queue;

monitor activity of each shared memory queue; and for each shared memory queue, issue activity update signals to corresponding registered threads.

20. The system of claim 19, further configured to:

perform a local thread wake-up or an interrupt-wakeup operation based on the activity update signal.

* * * * *